United States Patent
Hayes et al.

(10) Patent No.: US 6,776,011 B2
(45) Date of Patent: Aug. 17, 2004

(54) APPARATUS FOR CONVEYING GOBS OF GLASS TO A GLASS CONTAINER FORMING MACHINE

(75) Inventors: Dan M. Hayes, Waterville, OH (US); Mark R. Tipping, Bowling Green, OH (US)

(73) Assignee: Owens-Brockway Glass Container Inc., Toledo, OH (US)

( * ) Notice: Subject to any disclaimer, the term of this patent is extended or adjusted under 35 U.S.C. 154(b) by 343 days.

(21) Appl. No.: 09/942,899

(22) Filed: Aug. 30, 2001

(65) Prior Publication Data

US 2002/0046575 A1 Apr. 25, 2002

Related U.S. Application Data

(63) Continuation-in-part of application No. 09/642,348, filed on Aug. 21, 2000, now Pat. No. 6,494,061.

(51) Int. Cl.[7] .............................................. C03B 07/14
(52) U.S. Cl. ............................ 65/304; 65/356; 65/225; 193/2 R
(58) Field of Search ............................ 193/2 R; 65/25.1, 65/127, 225, 304, 356, 182.2, 374.12

(56) References Cited

U.S. PATENT DOCUMENTS

| | | | |
|---|---|---|---|
| 1,638,593 A | | 8/1927 | Mulholland |
| 1,959,328 A | | 5/1934 | Bartholomew |
| 3,198,616 A | | 8/1965 | Havens |
| 3,340,038 A | | 9/1967 | Hartman |
| 3,650,723 A | | 3/1972 | Wiley |
| 3,721,544 A | * | 3/1973 | Bystrianyk et al. ............ 65/207 |
| 4,529,431 A | | 7/1985 | Mumford |
| 4,718,933 A | | 1/1988 | Suomala et al. |
| 4,772,306 A | | 9/1988 | Davey et al. |
| 5,135,559 A | | 8/1992 | Sasso et al. |
| 5,298,049 A | | 3/1994 | Meyer |
| 5,458,668 A | | 10/1995 | Shoji |
| 5,549,727 A | | 8/1996 | Meyer |
| 5,599,370 A | | 2/1997 | Struckmeier et al. |
| 5,824,129 A | | 10/1998 | Struckmeier et al. |
| 5,846,283 A | | 12/1998 | Struckmeier et al. |
| 5,888,267 A | | 3/1999 | Schumann et al. |
| 5,935,287 A | | 8/1999 | Graefe et al. |

FOREIGN PATENT DOCUMENTS

| | | |
|---|---|---|
| DE | 2008741 | 10/1970 |
| DE | 196 43 108 A 1 | 4/1998 |
| EP | 1 182 171 A2 | 2/2002 |
| WO | WO 92/20631 | 11/1992 |

\* cited by examiner

*Primary Examiner*—Dionne A. Walls

(57) ABSTRACT

An inclined trough assembly (10) or gob scoop (20, 40) for conveying, by gravity, formable gobs of glass at an elevated temperature to a section of a glass container forming machine of the I.S. type. The trough assembly has a trough member (12) configured, in cross-section, generally corresponding to that of an upwardly facing V and a manifold (14) at least partly underlying the trough member and having a configuration, in cross-section, generally corresponding to that of an upwardly facing U. The trough member is inserted into the manifold partly to the bottom thereof, and the manifold has a compressed air inlet (14a) for receiving compressed or fan air to flow along the manifold in cooling contact with the trough member. The trough member has an opposed pair of legs (12a, 12b) joined at the bottoms thereof in a bight (12c), the upper free ends of the legs being spaced apart a greater distance than the width of gobs of the largest size in a wide range of sizes of gobs to be passed through the trough assembly, the bight having a radius greater than that of the gobs of the smallest size in the range of sizes. The trough member has a plurality of apertures (12e) extending therethrough. The gobs scoops (20, 40) have a cross-sectional configuration generally of an upwardly facing V with a curved member (22, 42) that has a curved bight (22e, 42e) from which curved opposed legs (22c, 22d; 42c, 42d) extends upwardly.

6 Claims, 8 Drawing Sheets

APPARATUS FOR CONVEYING GOBS OF GLASS TO A GLASS CONTAINER FORMING MACHINE

CROSS-REFERENCE TO RELATED APPLICATION

This application is a continuation-in-part of our U.S. patent application Ser. No. 09/642,348, which was filed on Aug. 21, 2000, now U.S. Pat. No. 6,494,061 B1 (Dec. 17, 2002).

FIELD OF THE INVENTION

This invention relates to a device for transferring gobs of molten glass from a supply of gobs to a blank mold of one of a plurality of side-by-side sections of a glass container forming machine of the individual section (I.S.) type. Specifically, this invention relates to a downwardly inclined device of the foregoing character, which is usually referred to as a trough, through which gobs pass in series enroute from an oscillating gob scoop to an I.S. machine section blank mold. The invention also relates to an oscillating gob scoop for transferring gobs of molten glass from a gob shear device to a relatively fixed trough.

BACKGROUND OF THE INVENTION

Most bottles and jars and other types of glass containers are now formed on an I.S. machine, which typically is made up of a multiplicity of like side-by-side container forming sections, for example eight or ten or even twelve such sections. Further, in higher productivity versions of I.S. machines, a multiplicity of like containers are simultaneously formed at each I.S. machine section, for example, two or three or even four such containers, by processes often described as the double gob process, the triple gob process or the quad process, respectively. In any case, each container formed by an I.S. machine section is formed from a gob of formable, molten glass in a two-step process. In the first of these steps, a preform of the container, which is often described as a blank or a parison, is formed in a first mold, often referred to as a blank mold, by blowing or pressing. The blank or parison, which is formed in an inverted position, that is, with its upper opening positioned beneath its bottom, is then transferred, by a 180° turning motion in a vertical plane, to a second mold, usually referred to as the blow mold, where it is blown into its final configuration, while in its normal upright orientation, after which the container along with the other containers simultaneously formed at such I.S. machine section are transferred out of the I.S. machine for further processing.

A delivery system for delivering gobs of molten glass from a gob shear device to an I.S. machine blank mold is made up of an oscillating gob scoop through which the gobs pass enroute to a substantially parallel plurality of pairs of devices that are fixed, though adjustably so, these devices being a straight, downwardly inclined trough that receives gobs from the oscillating gob scoop and a downwardly inclined deflector, which has a downwardly curved portion, that receives gobs from the trough and directs them to an I.S. machine section blank mold. This general arrangement is described in U.S. Pat. No. 4,529,431 (Mumford), which is assigned to a predecessor of the assignee of this application, the disclosure of which is incorporated by reference herein.

Gob delivery troughs of the type described above typically have a cross-section of an upwardly facing U, with the spacing between the legs of the U being determined by the size of the gobs to be passed therethrough. Thus, it has been necessary to replace gob delivery troughs for each I.S. machine section blank mold when it is desired to form containers of a substantially different size from the containers previously formed by such machine, which requires that the size of the gobs being delivered to the machine be increased or decreased accordingly. Heretofore, the replacement of troughs and deflectors has been frequently required for I.S. machines used to produce a wide variety of types and sizes of containers, and each such replacement is labor intensive, and therefore expensive, and time consuming, during which no containers are being produced by the I.S. machine.

It has also been determined that the time required for each gob to travel through a trough on its travel from an oscillating scoop to a blank mold can vary depending on the temperatures of the trough, because the coefficient of friction between the gob and the trough is higher when the temperatures of the trough are higher. This effect is more pronounced in I.S. machines with a relatively large number of sections, for example, ten or twelve sections, because the gob travel distances are longer to the blank molds of the outboard sections of the machine than to the interior sections of the machine. This phenomenon indicates the desirability of positively cooling the troughs and the deflectors of an I.S. machine, or at least those leading to the outboard sections of the machine, but the capital cost of doing so when a plurality of sets of troughs is required for each I.S. machine to accommodate a variety of gob sizes to be processed by the machine is a major deterrent to the use of positive cooling of troughs.

Another problem associated with prior art gob troughs arises from the fact that liquid coolant of the type used to cool shear devices that are used to shear gobs from streams of molten glass tends to flow downwardly through the troughs and tends to undesirably overcool or chill any portion of the gobs that may contact the bottom of the trough as they flow through the trough.

While the problem of variable travel times as a result of variable travel distances is not as serious a problem with oscillating gob scoops as it is with fixed gob troughs, it is still important to be able to reduce the required number of gob scoops per forming machine by increasing the range of gob sizes that can be accommodated by a given gob scoop without compromising the accuracy of the positioning of any gobs in a wide range of sizes with respect to the inlets of the gob troughs into which they are to be delivered.

SUMMARY OF THE INVENTION

The aforesaid and other problems associated with prior art glass gob delivery troughs are solved by glass gob delivery troughs according to the present invention. Illustratively, a gob delivery trough according to the present invention has a cross-section of an upwardly facing V. The space between the opposed legs of the V varies from a greater space at the top or open end of the V to a substantially lesser space at the bottom or closed end of the V, the space at the top or upper end of the V being greater than the width of the largest gob to be passed through the trough, and the space at the bottom or closed end of the V being less than the width of the smallest gob to be passed therethrough. This ensures that all gobs over a wide size range can be passed through the trough without the need to replace the trough to accommodate gobs of various sizes within the range, while also ensuring that no gob within the size range will be in contact with the bottom of the trough, and will, therefore, out of contact with any liquid coolant flowing through the trough. Further, a trough according to the present invention can be provided with an underlying air manifold for introducing compressed or fan air into the trough, through openings in the trough, to equalize trough to trough temperatures within the various troughs used on any given I.S. machine, and thereby provide more uniformity in the arrival times of the gobs at the various sections of the I.S. machine, notwithstanding inherent variations in the lengths of the troughs of an I.S. machine. This cooling air, if desired, can also be used to partly levitate the glass gobs in the trough, to speed up the travel of gobs through the trough.

A gob scoop according to the present invention, like the gob trough according to the present invention, has a cross-section of an upwardly facing V with a space between the free ends of its opposed leg being greater than that required for the largest gob to be passed therethrough. Thus, the space between the opposed legs of the V varies from a greater space at the top or open end of the V to a substantially lesser space at the bottom or closed end of the V, the space at the bottom or closed end of the V being less than the width of the smallest gob to be passed therethrough. This ensures that all gobs over a wide size range can be passed through the scoop without the need to replace the scoop to accommodate gobs of various sizes within the range, while also ensuring that no gob within the size range will be in contact with the bottom of the scoop, and will therefore, be out of contact with any liquid coolant flowing through the scoop. Further, a scoop according to the present invention can be provided with an underlying air manifold for introducing compressed or fan air into the scoop, through openings in the scoop, to equalize scoop to scoop temperatures within the various scoops used on any given I.S. machine, and thereby provide more uniformity in the arrival times of the gobs at the troughs leading to the various sections of the I.S. machine. This cooling air, if desired, can also be used to partly levitate the glass gobs in the scoop, to speed up the travel times of gobs through the scoop.

Alternatively, a scoop according to the present invention can be provided with an underlying flow passage for a liquid coolant, such as water, to indirectly cool the gob contacting surface of the scoop to thereby prevent thermal degradation of the material from which the scoop is to be cast or fabricated and to reduce the coefficient of friction between the gobs and the gob contacting surfaces of the scoop. In any case, with proper scoop cooling and with a very smooth gob contacting finish, it is possible to avoid the need to coat the gob contacting surfaces of the scoop to minimize heat transfer from the gobs to the scoop as the gobs travel through the scoop.

Accordingly, it is an object of the present invention to provide an improved trough for conveying gobs of molten glass from an oscillating gob scoop to a blank mold of an I.S. glass forming machine. More particularly, it is an object of the present invention to provide a trough of the foregoing character that is capable of handling a wide range of sizes of gobs, to eliminate the need for frequent replacement of troughs on an I.S. machine when the machine is converted to the manufacture of glass containers of a different size, from glass gobs of a different size. Even more particularly, it is an object of the present invention to provide a trough of the foregoing character that is shaped to ensure that gobs passing therethrough will be maintained out of contact with any liquid coolant that may be flowing through the trough at the bottom thereof.

It is also an object of the present invention, to provide an improved scoop for conveying gobs of molten glass from a gob shearing device to a trough for conveying gobs of molten glass to a blank mold of a I.S. glass forming machine. More particularly, it is an object of the present invention to provide a scoop of the foregoing character that is capable of handling a wide range of sizes of gobs, to eliminate the need for frequent replacement of scoops on a I.S. machine when the machine is converted to the manufacture of glass containers of a different size, from glass gobs of a different size. Even more particularly, it is an object of the present invention to provide a scoop of the foregoing character that is shaped to ensure that gobs passing therethrough will be maintained out of contact with any liquid coolant that may be flowing through the scoop at the bottom thereof.

For a further understanding of the present invention, and the objects thereof, attention is directed to the drawing and the following brief description thereof, to the detailed description of the preferred embodiment and to the appended claims.

IN THE DRAWINGS

DETAILED DESCRIPTION OF THE PREFERRED EMBODIMENTS

Figure 3:
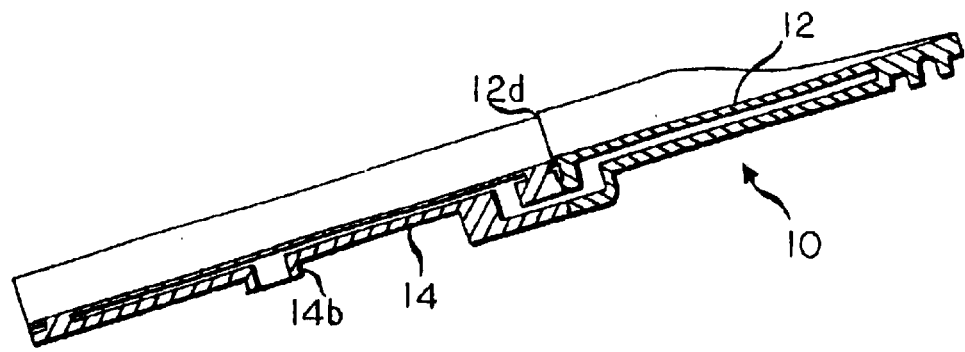
FIG. 3 is a cross-sectional view taken on line 3—3 of FIG. 2.
Figure 1:
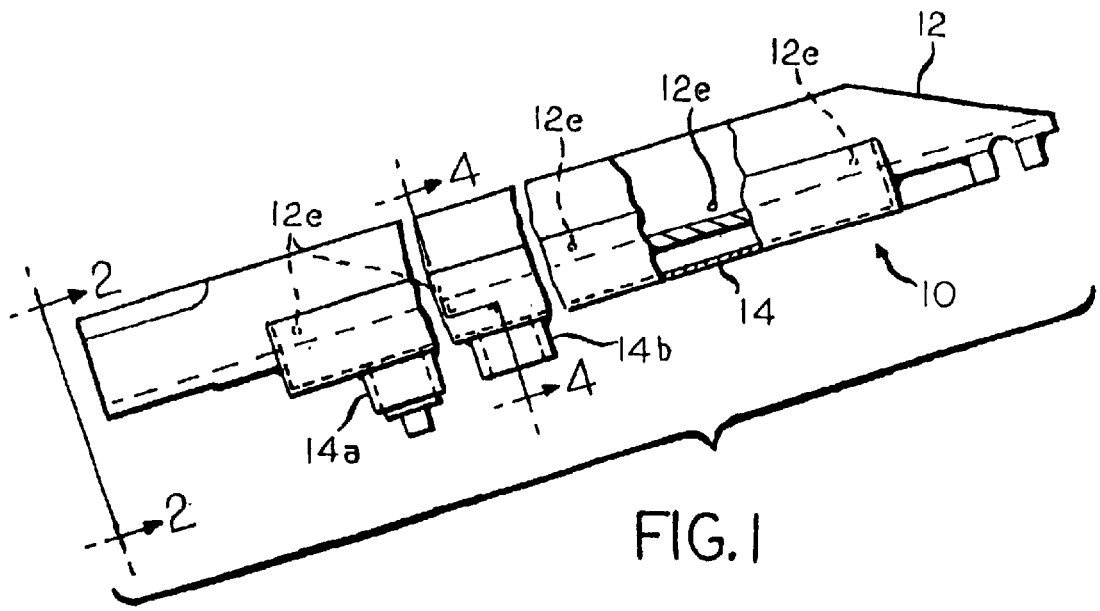
FIG. 1 is an elevation view, partly in cross-section, of a glass gob delivery trough assembly according to a preferred embodiment of the present invention.
Figure 2:
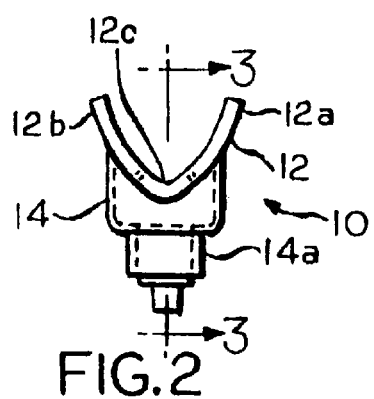
FIG. 2 is an end view of the trough of FIG. 1 taken on line 2—2 of FIG. 1.
Figure 4:
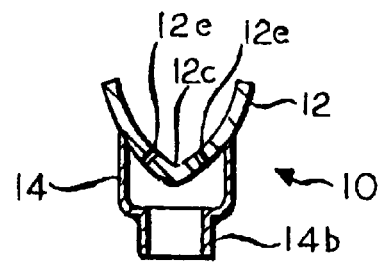
FIG. 4 is a sectional view taken on line 4—4 of FIG. 1.
Figure 5:
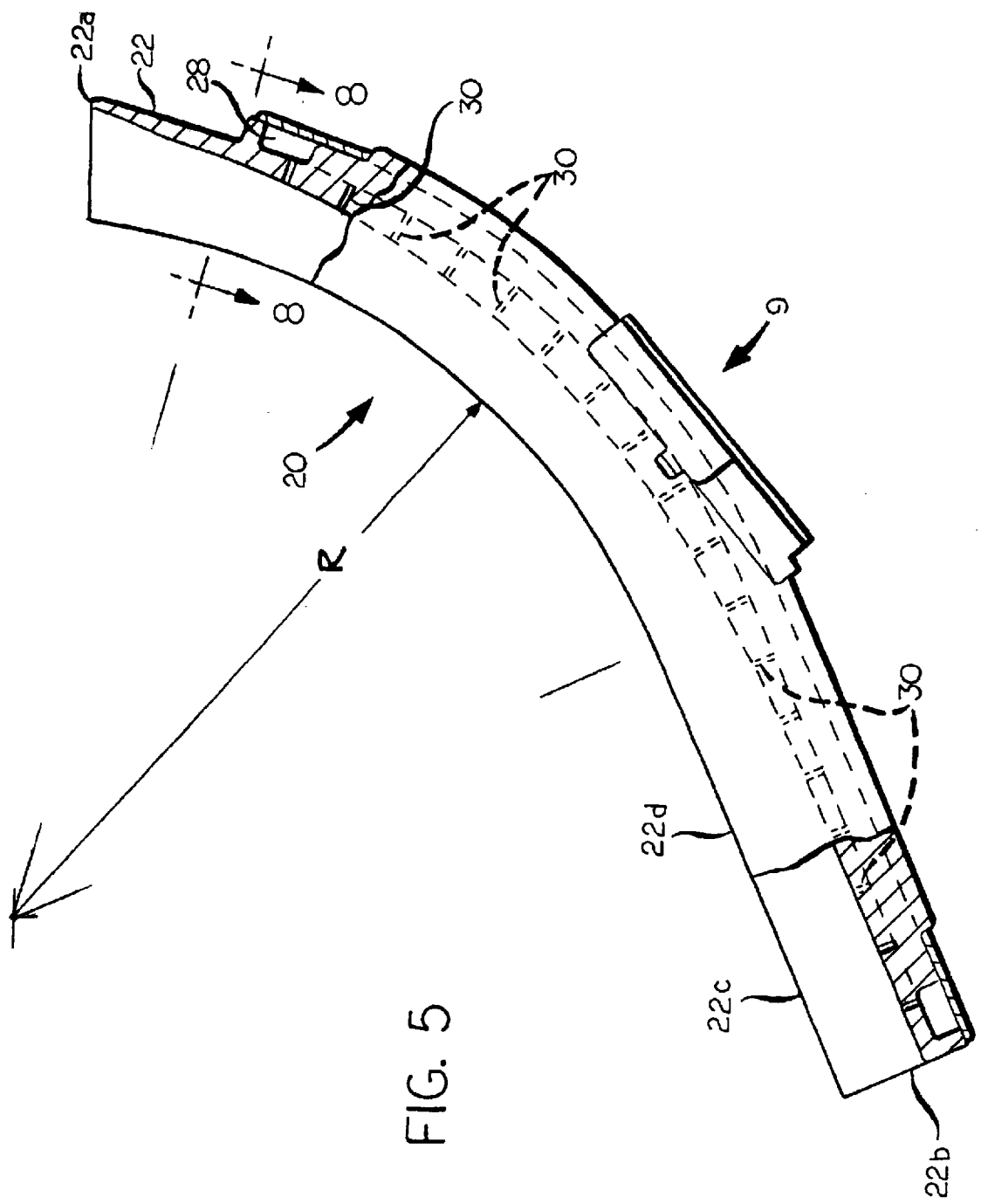
FIG. 5 is an elevational view, partly in cross-section, of an oscillatable glass gob scoop according to a preferred embodiment of the present invention.
Figure 6:
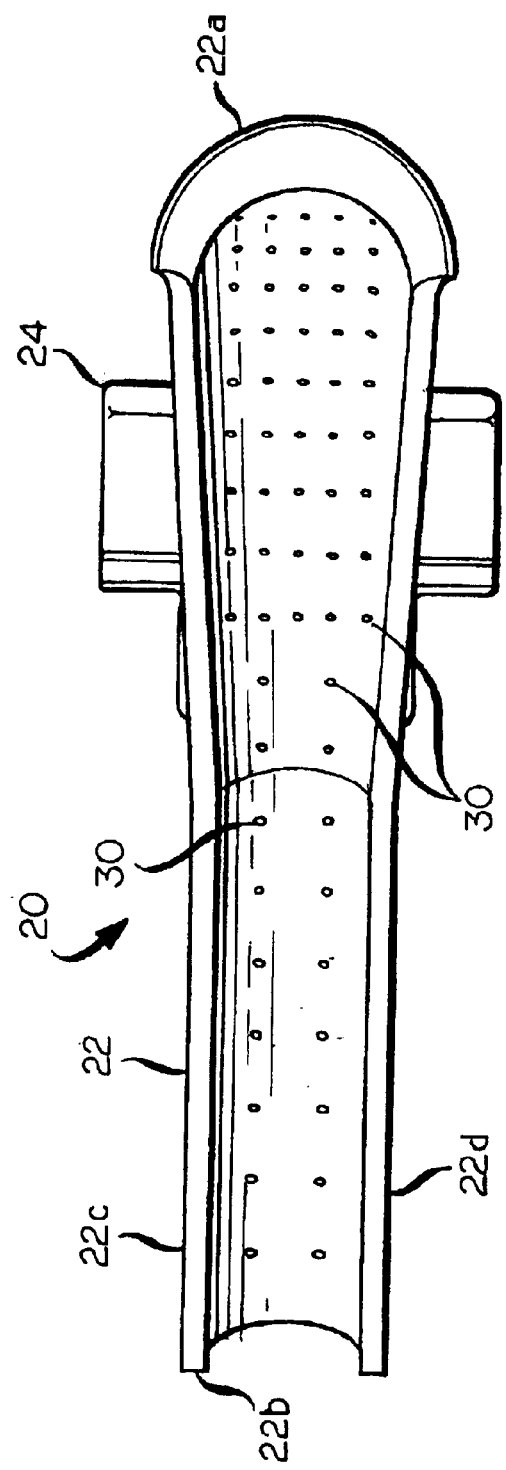
FIG. 6 is a plan view of the gob scoop of FIG. 5.

A glass gob delivery trough assembly according to the preferred embodiment of the present invention is generally identified by reference numeral 10 in the drawing, and the trough assembly 10 includes a downwardly extending trough member 12 that is generally V-shaped in cross-section, with an opposed pair of spaced apart converging legs 12a, 12b joined at a bight 12c at a bottom, closed end of the trough member 12, the trough member preferably being formed, in cross-section, in a single piece. The space between the legs 12a, 12b of the trough member 12, at the free ends thereof, is wider than the widest gob of a wide range of formable glass gobs to be passed through the trough assembly 10, and a radius of the bight 12c at the bottom of the trough member 12 is smaller than that of the smallest gob of the glass gobs to be passed through the trough assembly 10. Thus, all gobs in the range of gobs to be passed through the trough assembly 10 will be supported along the sides of the legs 12a, 12b, regardless of the size of such gobs, and none of the gobs in such range of gob sizes will be in contact with the bight 12c of the trough member 12. Keeping gobs out of contact with the bight 12c of the trough member 12 is important for process reasons, because liquid coolant from a gob shearing device, which is used to cool shear blades of such a device, may be flowing downwardly through the trough assembly 10 near the bottom or bight 12c of the trough member 12 thereof. As shown in FIG. 1, the trough member 12 may be formed of elements joined end to end, for example, at a juncture 12d.

A multitude of trough assemblies 10 must be used in each I.S. glass container forming machine, one such trough assembly 10 for each section of the forming machine, and typically there are eight, ten or twelve sections in each forming machine. The trough assemblies 10 for each machine, which may otherwise be the same in construction, must vary in length because each trough assembly 10 delivers gobs of formable glass to the forming machine from points on a common circular arc to machine sections that vary in distance from the common circular arc. Thus, gobs going to a more distant section tend to arrive at the section somewhat later than gobs arriving at a closer section, and this is a machine timing disadvantage because machine timing systems are based on the assumption that all gobs have arrived at their designated sections before further processing steps will begin. To make gob arrival times more uniform, each trough member 12 is air cooled by compressed or fan air introduced into the associated trough assembly 10 from a manifold 14 that underlies the trough member 12, the manifold 14 being configured as an upwardly facing U with the trough member 12 extending downwardly into the manifold 14 partly to the bottom thereof. Compressed or fan air is introduced into the manifold 14 through an inlet 14a and flows through the manifold 14 to an outlet 14b, some of the air flowing into the trough member 12 through apertures 12e therein.

The air flowing into the manifold, whether it stays in the manifold until it reaches the outlet 14b or flows into the trough member 12 through the apertures 12e, tends to cool the trough member 12 and the gobs flowing therethrough, and this reduces the coefficient of friction between the gobs and the trough member 12, and thereby speeds up the passage of the gobs through the associated trough assembly 10. Air introduced into a trough member 12 from a manifold 14, through the apertures 12e in the trough member 12, also tends to levitate the gobs passing through the trough member 12, which further reduces the coefficient of friction between the gobs and the trough member 12. Thus, by regulating the flow of compressed or fan air through the trough assemblies 10 of a given glass container forming machine, on a trough assembly 10 by trough assembly 10 basis, it is possible to substantially equalize the arrival times of the gobs at the various machine sections, notwithstanding variations in lengths of the paths traveled by gobs in reaching their designated machine sections, and this factor helps to improve the productivity of a given glass container forming machine. Moreover, the use of a trough member 12 with a cross-section that is capable of delivering a wide range of gob sizes, as is a trough member 12 as heretofore described, improves machine productivity by reducing the frequency with which the trough assemblies 10 need to be replaced to accommodate gobs of different sizes as the forming machine is changed to produce containers of different sizes.

FIGS. 5–10 illustrate a gob scoop, which is generally indicated by reference numeral 20, according to an embodiment of the present invention. The gob scoop 20 is oscillatable in steps, for example, by a gob scoop drive of the type taught in commonly assigned U.S. Pat. No. 5,895,514 (DiFrank), the disclosure of which is incorporated herein by reference, to deliver gobs of molten glass to various trough assemblies, such as the trough assemblies 10, of a I.S. machine. The gob scoop 20 has a curved member 22 that receives vertically dropping glass gobs at an upper end 22a thereof and discharges such gobs at a slight incline to a horizontal orientation from a lower end 22b thereof.

Figure 7:
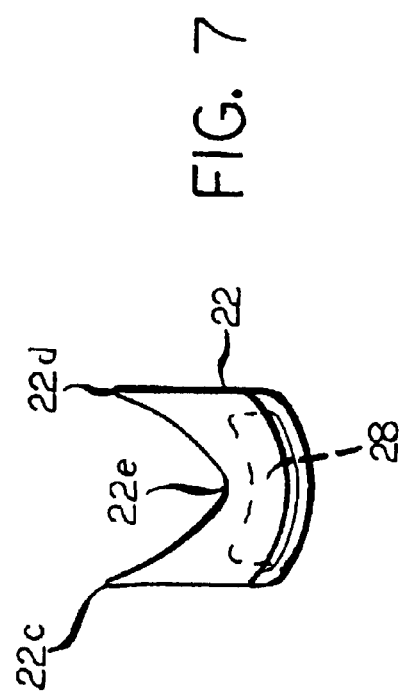
FIG. 7 is an end view of the bottom portion of the gob scoop of FIGS. 5 and 6.
Figure 8:
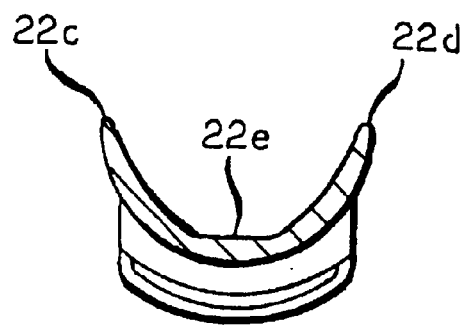
FIG. 8 is a sectional view taken on 8—8 of FIG. 5.
Figure 10:
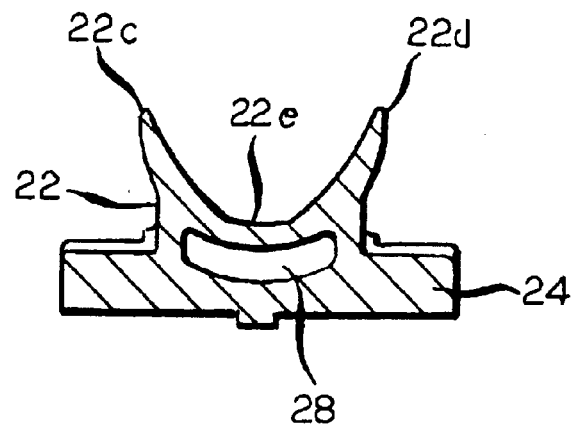
FIG. 10 is a sectional view taken on line 10—10 of FIG. 9.
Figure 9:
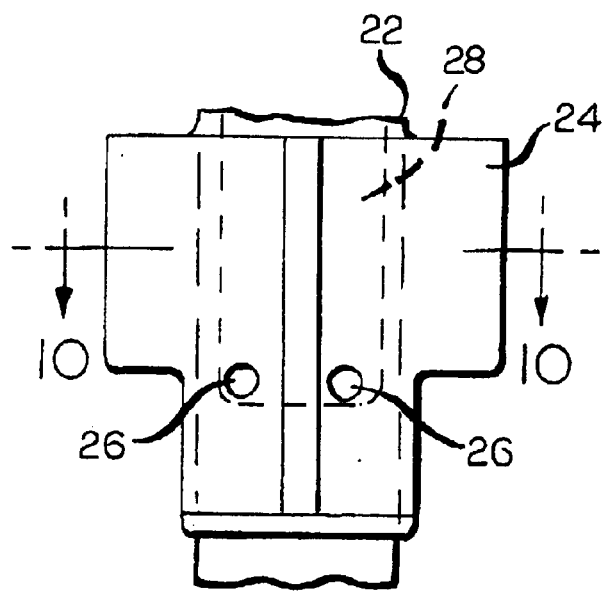
FIG. 9 is a view taken in the direction of the arrow 9 of FIG. 5.
Figure 11:
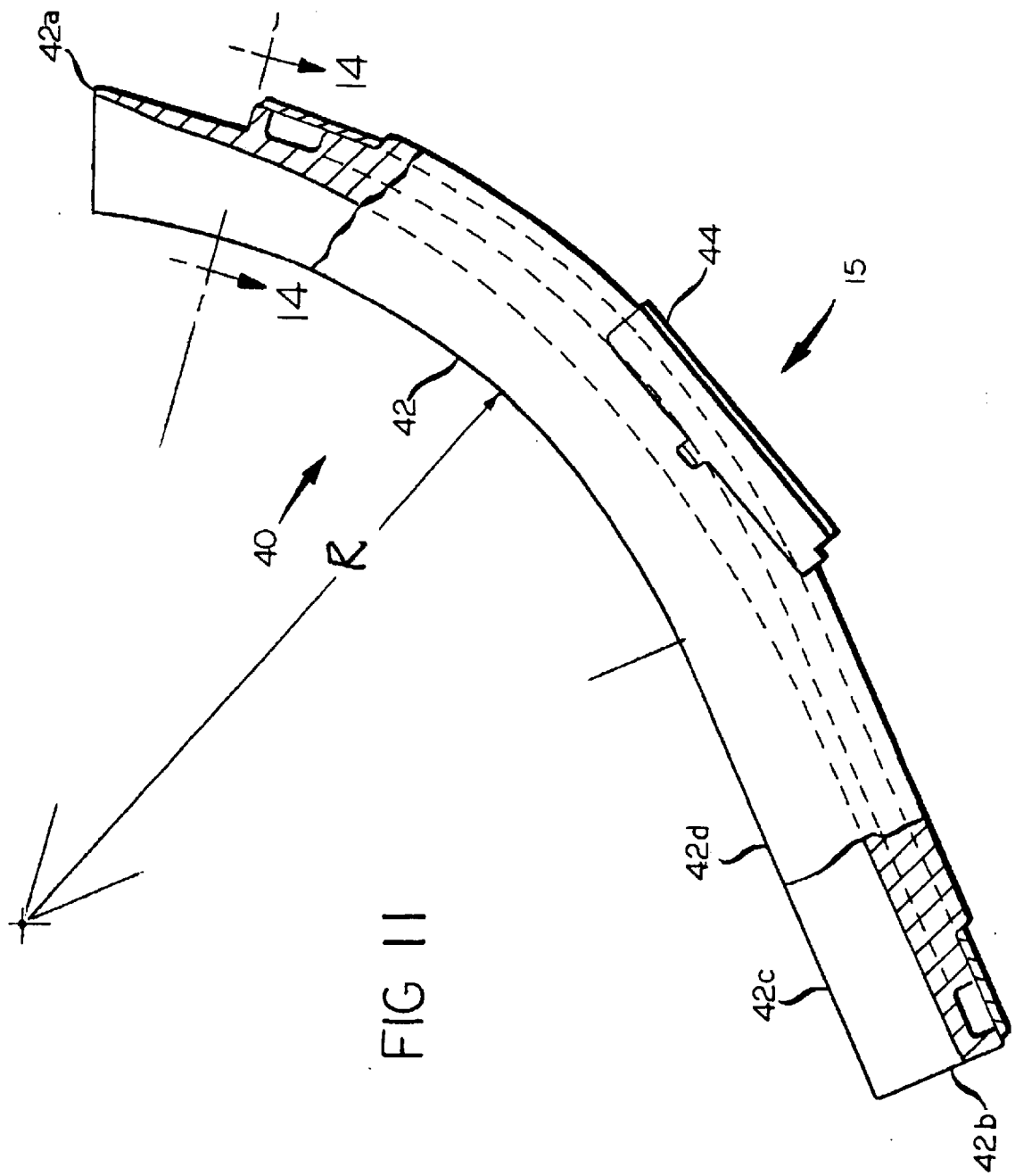
FIG. 11 is a view like FIG. 5 of an alternative embodiment of the gob scoop according to the present invention.
Figure 12:
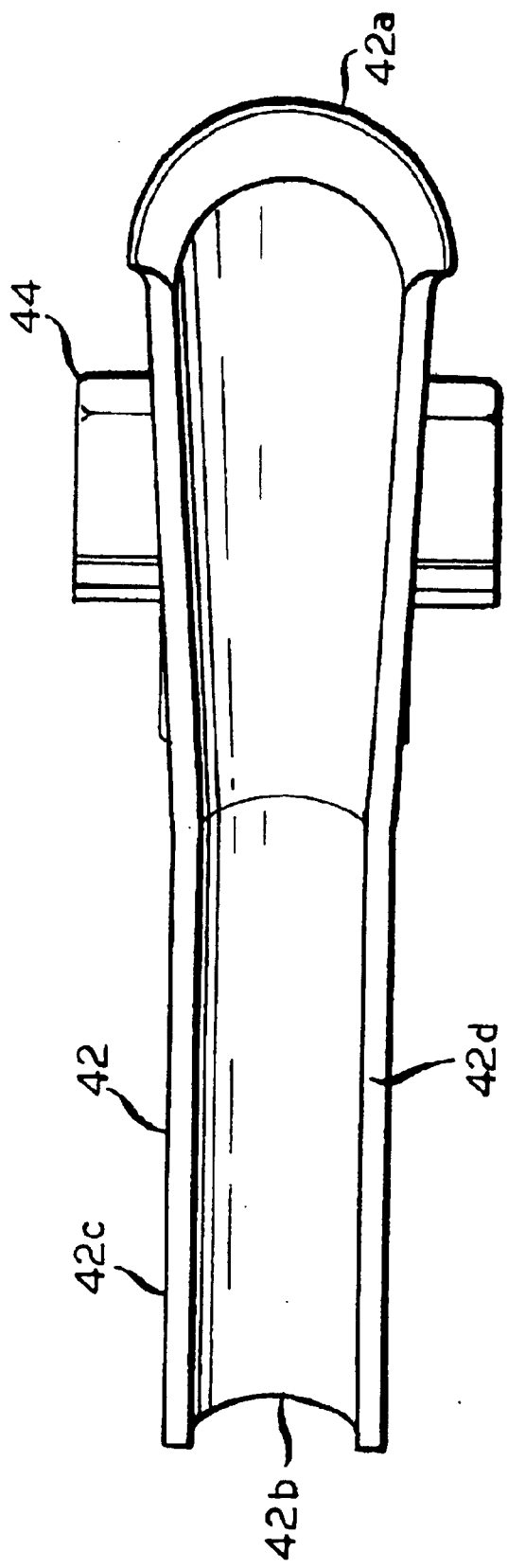
FIG. 12 is a plan view of the gob scoop of FIG. 11.

The curved member 22 is secured at a location between its ends 22a, 22b to an integral, transversely extending support member 24, and is generally V shaped in cross-section along its length as can be seen from FIGS. 7 and 8. Thus, the curved member 22 has an opposed pair of legs 22c, 22d that curve at gradually increasing radii upwardly and outwardly from a rounded bight 22e. The space between the free ends of the legs 22c, 22d is greater than the width of the largest glass gob in a wide range of sizes of gobs to be passed through the gob scoop 20, and the radius of the bight 22e is smaller than that of the smallest of the gobs in such a wide range of sizes, so that all gobs in such sizes will be supported at opposed point on legs 22c, 22d as they pass through the gob scoop 20. In this way, there will be no localized chilling of any gobs as a result of contact with liquid coolant flowing through the gob scoop 20 from a gob shear device that overlies the upper end 22a of the member 22.

The support member 24 has at least one inlet 26 for a gaseous coolant medium, shown as two such inlets for introduction of air or another gas into a space 28 that underlies the bight 22e of the member 22. The gas that is introduced into the space 28 can be used to indirectly cool the member 22, in which case one of the inlets 26 will be used as an outlet and a longitudinally extending partition (not shown) will extend for a major portion of the length of the space 28, between the inlets 26, to direct coolant into a pair of cooling passages that are connected in series. Alternatively, and as shown, the member 22 can be provided with a multitude spaced-apart apertures 30. Such apertures will permit gaseous coolant from the space 28 to flow into contact with gobs passing through the gob scoop 20 to further cool the member 22 and to levitate or partly levitate the gobs passing through the gob scoop 20 to thereby speed up their arrival times at the lower end 22b of the member 22. The member 22 may be cast from a suitable heat-resistant stainless steel or aluminum in which case the support member 24 is preferably cast integrally with the member 22. The support member 24 and the member 22 may also be fabricated from separate pieces.

Figure 13:
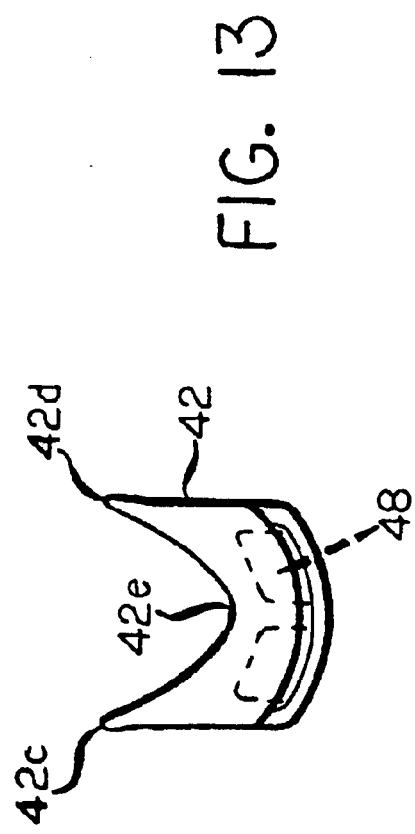
FIG. 13 is an end view of the bottom of the gob scoop of FIGS. 11 and 12.
Figure 14:
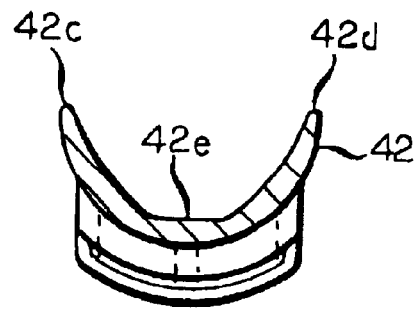
FIG. 14 is a sectional view taken on line 14—14 of FIG. 11.
Figure 16:
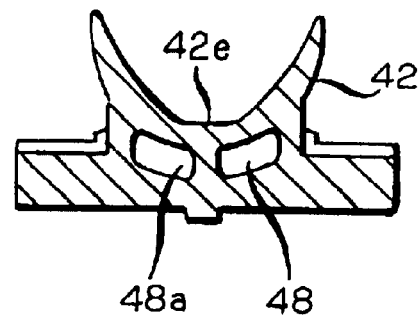
FIG. 16 is a sectional view taken on line 16—16 of FIG. 15.
Figure 15:
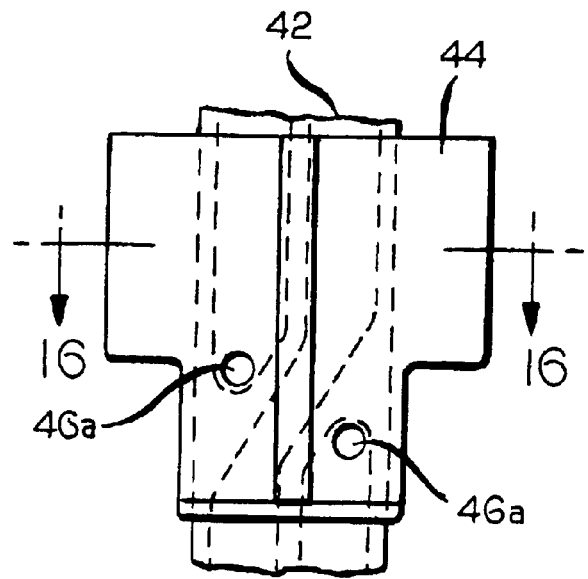
FIG. 15 is a view taken in the direction of the arrow 15 in FIG. 11.

The gob scoop according to the embodiment of FIGS. 11–16 is indicated generally by reference numeral 40, and, except as hereinafter indicated, the gob scoop 40 corresponds in construction and function to gob scoop 20. Thus, the gob scoop 40 has a curved member 42 with an upper gob inlet 42a and a lower gob outlet end 42b. As is shown in FIGS. 13 and 14, the member 42 has the cross-sectional configuration of an upwardly facing V, with a curved bight 42e from which curved opposed legs 42c, 42d extend upwardly. In that regard, the radius of the bight 42e is less than the radius of the smallest glass gob to be passed through gob scoop 40, and the spacing between the free ends of the legs 42c, 42d is greater than the width of the largest glass gob to be passed through the gob scoop 40, so that all gobs in a wide range of gob sizes will be supported at opposed locations by the legs 42c, 42d, and will not contact the bight 42e, to thereby avoid being locally chilled by any shear device coolant that maybe flowing through the gob scoop 40. The member 42, which has a support member 44 joined thereto, may be cast from a suitable heat-resistant stainless steel or aluminum in which case preferably the support member is cast integrally with the member 42. The member 42 and the support member 44 may also be fabricated from separate pieces. In any case, the support member 44 is provided with a coolant inlet opening 46a and a coolant outlet opening 46b through which water or other liquid coolant can be caused to flow through a space 48 in indirect cooling relationship with the gob contacting surfaces of the member 42. In that regard, longitudinally extending partition 48a is provided in the space 48 to separate it into parallel inlet and return flow paths.

Figure 17:
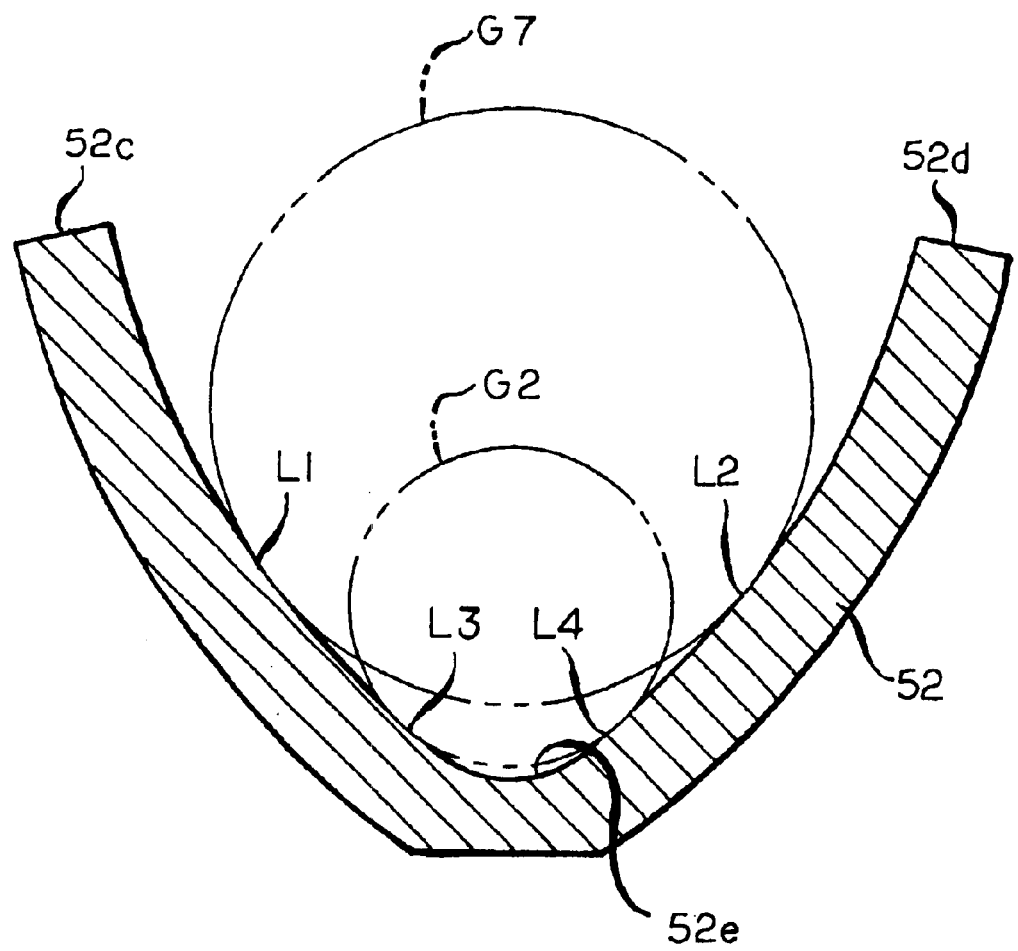
FIG. 17 is a schematic view showing a view of a gob scoop according to the present invention in the processing of glass gobs of widely varying sizes.

FIG. 17 schematically shows the function of both the gobs scoop 20 and the gob scoop 40 in the context of a curved member 52 that may be considered to embody a feature that is common both to the curved member 22 of the embodiment of FIGS. 5–10 and the curved member 42 of the embodiment of FIGS. 11–16. The member 52 shows contact between walls 52c, 52d of the member 52 with the largest gob G1 in an arrange of gob sizes to be passed through the member 52 as well as with the smallest gob G2 in such a range of gob sizes. Both gobs G1 and G2, and all gobs in between the sizes of G1 and G2, are supported by the walls 52c, 52d at opposed locations L1, L2 for the gob G1, and L3, L4 for the gob G2, and neither the gob G1 nor the gob G2, nor any gob in between the sizes of the gobs G1, G2, makes any contact with the bight 52e of the member 52.

Because a gob, either a gob G1 or a gob G2 or any gob in a size therebetween, is supported on its opposed sides by any of the curved members 22, 42 or 52, it is likely to be very accurately centered with respect to the centerline of a trough into which it is delivered, and this will help to minimize frictional losses, and to equalize travel times, for gobs traveling through such trough.

The radius of curvature R of each of the curved members 22, 42 gradually increases as the curved member 22 or 42 proceeds from its inlet end to its outlet end, at least until the curved member enters a straight portion over the last 6–7 inches of its length, and this configuration helps to keep the gob in contact with the curved member as it proceeds through the curved member, as opposed to bouncing along the curved member on its pass therethrough. This serves to equalize travel times of gobs passing through the curved member and to prevent any gob from wedging between the sides of the curved members as it settles back from an airborne position relative to the curved member.

Preferably, for each of the curved member 22 of the embodiment of FIGS. 5–10 and the curved member 42 of the embodiment of FIGS. 11–16, the upwardly facing, gob contacting surface is very smooth to avoid the need for providing either such surface with a coating. A 10 RMS surface finish has been found to be adequate for such purpose.

Although the best mode contemplated by the inventors for carrying out the present invention as of the filing date hereof has been shown and described herein, it will be apparent to those skilled in the art that suitable modifications, variations and equivalents may be made without departing from the scope of the invention, such scoping limited solely by the terms of the following claims and the legal equivalents thereof.

What is claimed is:

1. An elongate member for conveying gobs of molten glass from an inlet to such device to an outlet from such device, said member being curved, in a vertical plain that extends parallel to a longitudinal axis of said device, from a higher elevation at the inlet to a lower elevation at the outlet, and being selected from the group consisting of an oscillatable gob scoop for delivering gobs of glass to an inlet of a relatively fixed trough and a relatively fixed trough for receiving gobs of glass from an outlet from an oscillatable scoop, said member having a configuration, in cross-section, generally corresponding to that of an upwardly facing V with an opposed pair of legs that are joined, at bottom ends thereof, in a rounded bight, the legs being spaced apart, at upper free ends, by a distance greater than a width of the largest gob in a wide range of gob sizes to be passed through the elongate member, the bight having a radius smaller than that of a smallest size of the gobs in the range of gob sizes:

wherein said elongate member is an oscillatable scoop, said oscillatable scoop having a gob contacting surface that is smooth and uncoated and further comprising:

means for indirectly cooling said gob contacting surface.

2. An elongate member according to claim 1 wherein said means for indirectly cooling said gob contacting surface comprises:

means underlying said scoop for circulating a liquid coolant through said scoop in indirect contact with said gob contacting surface.

3. An elongate member according to claim 1 wherein said means underlying said scoop for circulating a coolant in indirect contact with said contacting surface comprises means for circulating a gaseous coolant through said scoop.

4. An elongate member according to claim 3 and further comprising:

a plurality of apertures in said gob scoop for allowing a gaseous coolant passing into said means underlying said scoop to thereafter pass into said scoop in direct cooling contact with glass gobs passing through said scoop.

5. An elongate member according to claim 1 wherein said gob contacting surface has a surface finish of at least 10 RMS.

6. An elongate member according to claim 1 wherein said member has a radius near its inlet, along the longitudinal axis, that is substantially smaller than a radius, near its outlet, along the longitudinal axis, a final portion of the elongate member, immediately inward of the outlet, being straight.

* * * * *